UNITED STATES PATENT OFFICE.

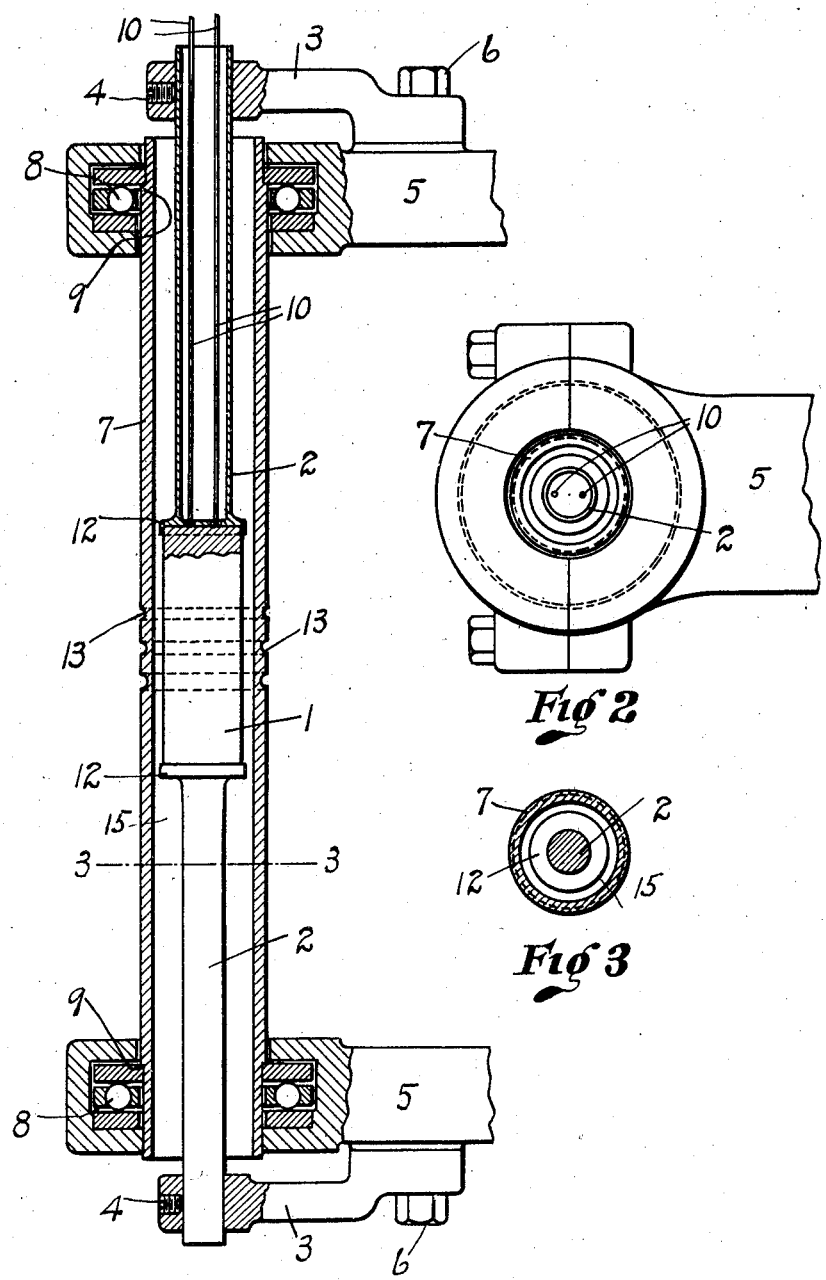

LOUIS J. VAN GUELPEN, OF CINCINNATI, OHIO.

BURNISHING-TOOL.

1,362,762.  Specification of Letters Patent.  Patented Dec. 21, 1920.

Application filed April 14, 1917. Serial No. 162,183.

*To all whom it may concern:*

Be it known that I, LOUIS J. VAN GUELPEN, a citizen of the United States, residing at the city of Cincinnati, in the county of Hamilton and State of Ohio, have invented certain new and useful Improvements in Burnishing-Tools, of which the following is a specification.

The object of my invention is to provide a simple and highly efficient, heated revolving burnishing tool for burnishing, finishing and operating upon the edges of leather parts, as for example a vamp for shoes; it may, however, be used for burnishing the edge of any leather part or the edge of any other material.

A tool of this class is operated at high speed and is revolved by suitable means in connection with a machine used for this purpose and not shown in the drawings, but which is well understood in the art of edge burnishing.

Its various features and advantages will readily become apparent from a perusal of the following specification and claims.

In the accompanying drawings forming part of this specification:

Figure 1, is a longitudinal section of the spindle and of connecting parts, partly broken away, some of said parts being shown in elevation, Fig. 2, is a plan view of the parts looking down upon Fig. 1, and Fig. 3, is a sectional view taken on line 3—3 of Fig. 1.

In carrying out my invention, I provide a heating unit, preferably electrically heated and of any desired form or character. This unit is held supported in position between two supporting stems or posts 2—2, one of which extends up and one down from brackets 3—3, the screws 4 holding the posts in position. These brackets 3—3, are held on the arms 5 by screws 6. The posts 2—2, have at their inward extremity a cap 12 the unit fitting into said caps, so that when the unit and posts are in alinement and together, they are held in a normal position against displacement.

In order to properly support the spindle I provide an upper and a lower arm 5, which in the drawing are shown broken away, but they are connected with the mechanism which makes up the machine for operating the burnishing tool. The revolving spindle or burnishing tool 7 passes through the arms 5—5, above and below as shown, and surrounds the unit 1 and posts 2, a space 15 being left between said parts and this space is continuous throughout the spindle. In the arms 5—5, where the spindle passes through, I provide roller bearings as 8 of any approved form, so that the tool will operate smoothly and with little friction. The shoulders 9 on the spindle prevent said spindle from slipping through the bearings.

The top post or stem 2 is hollow as shown so that the electric current can be supplied to the wires in any manner desired.

The heating unit is heated by means of the wires 10 and the heat is imparted to the spindle 7 as it revolves around the unit, the heat being the greatest at the point where the unit is present, at which point I place peripheral grooves as 13 around said spindle 17. The space 15 forming a passage way through the spindle, allows for the passage of air, so that the revolving spindle will not become too highly heated, thus preventing the scorching or burning of the material to be operated upon.

The unit and its connecting parts are stationary and the spindle revolves around them at a high speed.

The edge of the leather or other material to be burnished is fed into and through the grooves 13 and by the heated revolving burnishing tool is burnished to the proper degree, quickly and efficiently.

Any means may be used for supporting the material or feeding the same while it is being operated upon. The tool may be cooled in any other manner than herein shown, if desired.

It will be understood that the tool may be somewhat modified as found expedient.

What I claim as new and my invention and desire to secure by Letters Patent is:

1. A tool for burnishing, comprising a stationary electric heating unit, and a vertically disposed revoluble spindle entirely surrounding the same.

2. A tool for burnishing, comprising a revoluble spindle and a stationary heating unit supported on stems in said spindle, the upper stem being hollow, said heating unit and spindle spaced apart to provide a passage way between them.

3. A tool for burnishing, comprising a vertically disposed, hollow, revoluble spindle and a heating means situated within said spindle, and spaced therefrom to form a passage way, the spindle entirely surrounding said heating means, the heating means being independently supported in said spindle at each end thereof.

Witness my hand at Cincinnati, Ohio, March 2nd, 1917.

LOUIS J. VAN GUELPEN.

Witnesses:
 H. E. CARSTENS,
 GEO. H. RICKE.